(12) United States Patent
Dipaola et al.

(10) Patent No.: US 12,703,260 B2
(45) Date of Patent: Aug. 11, 2026

(54) APPARATUS FOR ELECTRIC CAR BOOSTER AND CHARGER OVER FAST CHARGING DC

(71) Applicants: Anthony Vito Dipaola, Pelham, NY (US); Chad Alan Merritt, New Milford, CT (US)

(72) Inventors: Anthony Vito Dipaola, Pelham, NY (US); Chad Alan Merritt, New Milford, CT (US)

( * ) Notice: Subject to any disclaimer, the term of this patent is extended or adjusted under 35 U.S.C. 154(b) by 943 days.

(21) Appl. No.: 17/897,752

(22) Filed: Aug. 29, 2022

(65) Prior Publication Data

US 2023/0062873 A1 Mar. 2, 2023

Related U.S. Application Data

(60) Provisional application No. 63/237,896, filed on Aug. 27, 2021.

(51) Int. Cl.

*B60L 53/50* (2019.01)
*B60L 53/16* (2019.01)
*B60L 53/63* (2019.01)
*H02J 3/38* (2006.01)
*H02J 7/34* (2006.01)
*H02J 7/35* (2006.01)
*H02J 101/24* (2026.01)
*H02J 105/37* (2026.01)

(52) U.S. Cl.

CPC ............... *B60L 53/50* (2019.02); *B60L 53/16* (2019.02); *B60L 53/63* (2019.02); *H02J 3/381* (2013.01); *H02J 7/345* (2013.01); *H02J 7/35* (2013.01); *H02J 2101/24* (2026.01); *H02J 2105/37* (2026.01)

(58) Field of Classification Search

CPC ...................................................... B60L 53/50
USPC .......................................................... 320/109
See application file for complete search history.

(56) References Cited

U.S. PATENT DOCUMENTS 9,007,020 B2 * 4/2015 Prosser .................. B60L 53/53 320/109
10,576,573 B2 * 3/2020 Fosbinder ............ B23K 9/1006
11,691,530 B2 * 7/2023 Merritt .................... B60L 53/31 320/109
12,081,051 B1 * 9/2024 Kanarek ............... H02J 7/0042
2018/0281613 A1 * 10/2018 Yu .......................... B60L 53/32
2019/0351783 A1 * 11/2019 Goei ..................... B60L 53/665
2021/0339646 A1 * 11/2021 Jankel ..................... B60L 53/53
2021/0376634 A1 * 12/2021 Smith ...................... H02M 7/48
2022/0001762 A1 * 1/2022 Farkas .................. H02J 7/0045
2023/0057374 A1 * 2/2023 Sohl ........................ B60L 53/50
2023/0339352 A1 * 10/2023 Folchert .................. B60L 53/80
(Continued)

FOREIGN PATENT DOCUMENTS

EP 4105459 A2 * 12/2022 ........... H02J 7/0048

*Primary Examiner* — Jerry D Robbins
(74) *Attorney, Agent, or Firm* — Leason Ellis LLP

(57) ABSTRACT

In one or more implementations, a portable booster or charging device is provided that provides emergency power to an electric vehicle. In one or more configurations, such an electric vehicle ("EV") charger is configured to supply an EV with sufficient power that so that the vehicle will not require a tow-truck or otherwise be stranded. Specifically, the present invention is directed to providing on-demand or emergency power to EVs that are out of power and away from a dedicated charging facility.

13 Claims, 4 Drawing Sheets

(56) References Cited

U.S. PATENT DOCUMENTS

2023/0360466 A1* 11/2023 Joao ........................ B60L 53/64
2024/0294079 A1* 9/2024 Podhola .................. B60L 1/006

* cited by examiner 107
204
Power Management
Device
100
304
202
Energy storage
202
Energy storage
202
Energy storage
110

APPARATUS FOR ELECTRIC CAR BOOSTER AND CHARGER OVER FAST CHARGING DC

CROSS REFERENCE TO RELATED APPLICATION

The present application claims the benefit of U.S. patent application Ser. No. 63/237,896, filed Aug. 27, 2021, which is hereby incorporated by reference in its entirety.

BACKGROUND OF THE INVENTION

There exists a need in the art to have multiple recharging options for electric vehicles. Currently, when electric cars have completely expended the electric charge stored in their batteries, they cannot be operated safely. Complete expenditure of electric batteries is a common occurrence in both the summer and winter months, as extreme temperatures can be linked to rapid discharge of electric vehicle batteries. Once an electric vehicle has completely expended its battery charge, the vehicle cannot be moved easily and often requires a tow truck or other transport device to transport the electric vehicle to a charging station. Furthermore, even if a tow-truck is readily available, the nearest electric vehicle charging station may be at considerable distance, thus increasing the cost to the vehicle owner.

Therefore, there is an unmet need to provide a portable option to charge electric vehicles while away from a charging station. In one or more implementations, a portable booster or charging device is provided that provides emergency power to an electric vehicle. In one or more configurations, such an electric vehicle ("EV") charger is configured to supply an EV with sufficient power that so that the vehicle will not require a tow-truck or otherwise be stranded. Specifically, the present invention is directed to providing on-demand or emergency power to EVs that are out of power and away from a dedicated charging facility.

SUMMARY OF THE INVENTION

In one or more implementations, the present invention is directed to one or more portable power sources that are configured to supply sufficient electrical energy to an electric vehicle to effectuate charging thereof.

In one particular implementation, the EV charger described herein includes an apparatus for charging an electric vehicle comprising:

a liquid fueled generator configured to output at least 110 volts for at least 15 minutes; and a control system configured to control the voltage output.

In one or more further configurations, the EV charging apparatus includes a charging wand configured to couple to a charging port of an electric vehicle.

In one or more further configurations, the EV charging apparatus includes at least one control device, wherein the control device is configured to cause an increase in the voltage output of the generator.

In one or more further configurations, the EV charging apparatus includes one or more rechargeable battery packs.

In one or more further configurations, the EV charging is configured to cause the energy stored within the one or more rechargeable battery packs to be discharged.

In one or more further configurations, the EV charging apparatus includes a power control device configured to receive the electrical energy discharged from the rechargeable battery pack and the power generated by the liquid fueled generator and cause a voltage output that exceeds the voltage output when the control device is not activated.

In one or more further configurations, the EV charging apparatus is configured to provide an output voltage of at least 240 volts for one hour.

In one or more further configurations, the EV charging apparatus is configured to provide an output voltage of at least 480 volts.

In one or more further implementations, a EV charger apparatus is provided that includes: a liquid fueled generator configured to be capable of outputting at least 240 volts and 2.3 kW of direct current (DC) for at least one hour; and a control system configured to control the liquid fueled generation output of DC.

In one or more further implementations, a EV charger apparatus is provided that includes: a battery array configured to be capable of outputting at least 240 volts and 2.3 kW of direct current (DC) for at least one hour; and a control system configured to control the output of DC.

In one or more particular implementations, the descried emergency charging device is configured to provide at least three different types configurations: quick charging, charge boosting, and a solar based charging system.

BRIEF DESCRIPTION OF THE DRAWINGS

The foregoing and other features of the present invention will be more readily apparent from the following detailed description and drawings of illustrative embodiments of the invention in which list the drawings and their captions.

DETAILED DESCRIPTION OF THE INVENTION

Figure 1:
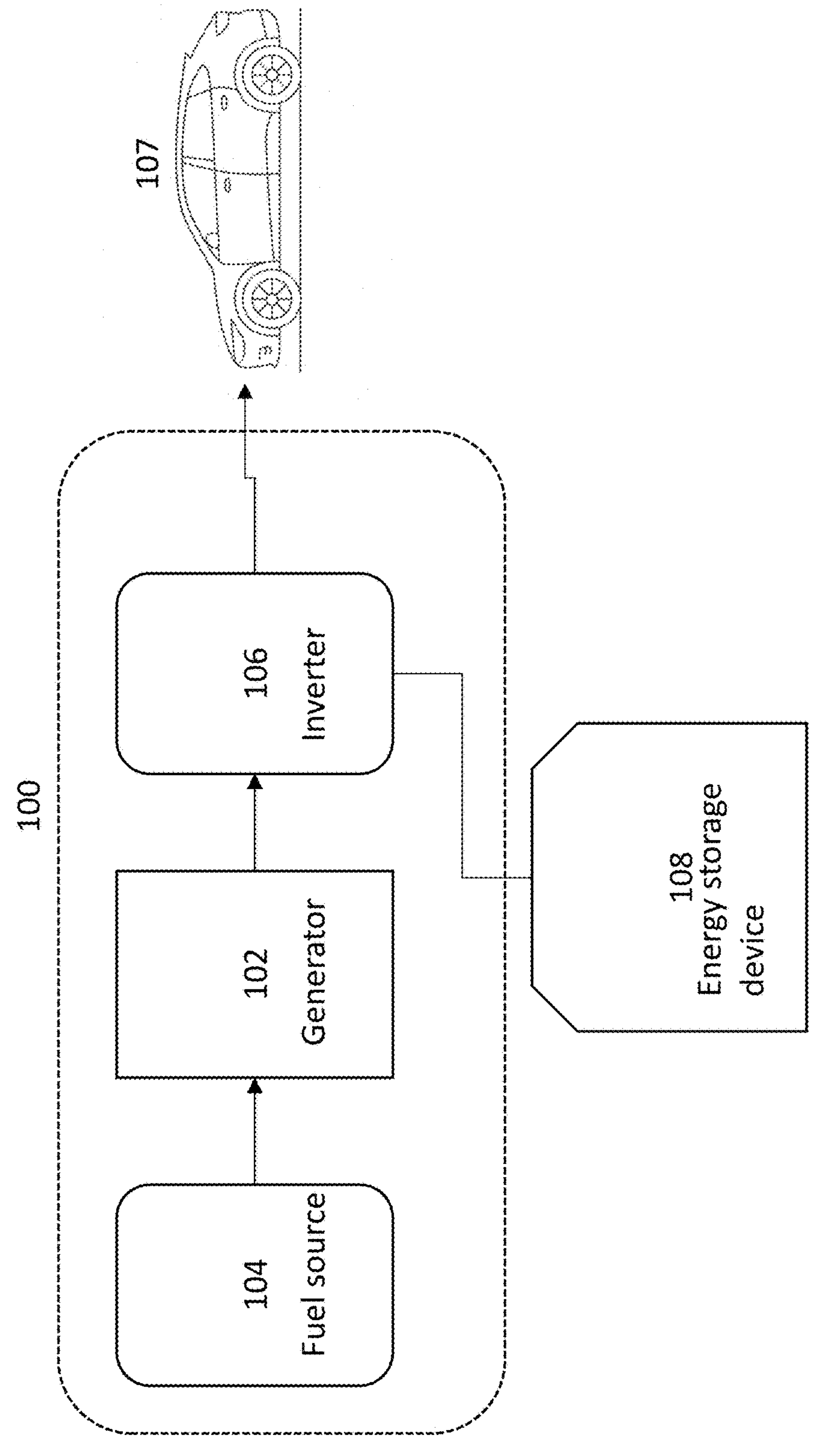
FIG. 1 is an illustrative diagram of one of the components of an embodiment of the invention.
Figure 2:
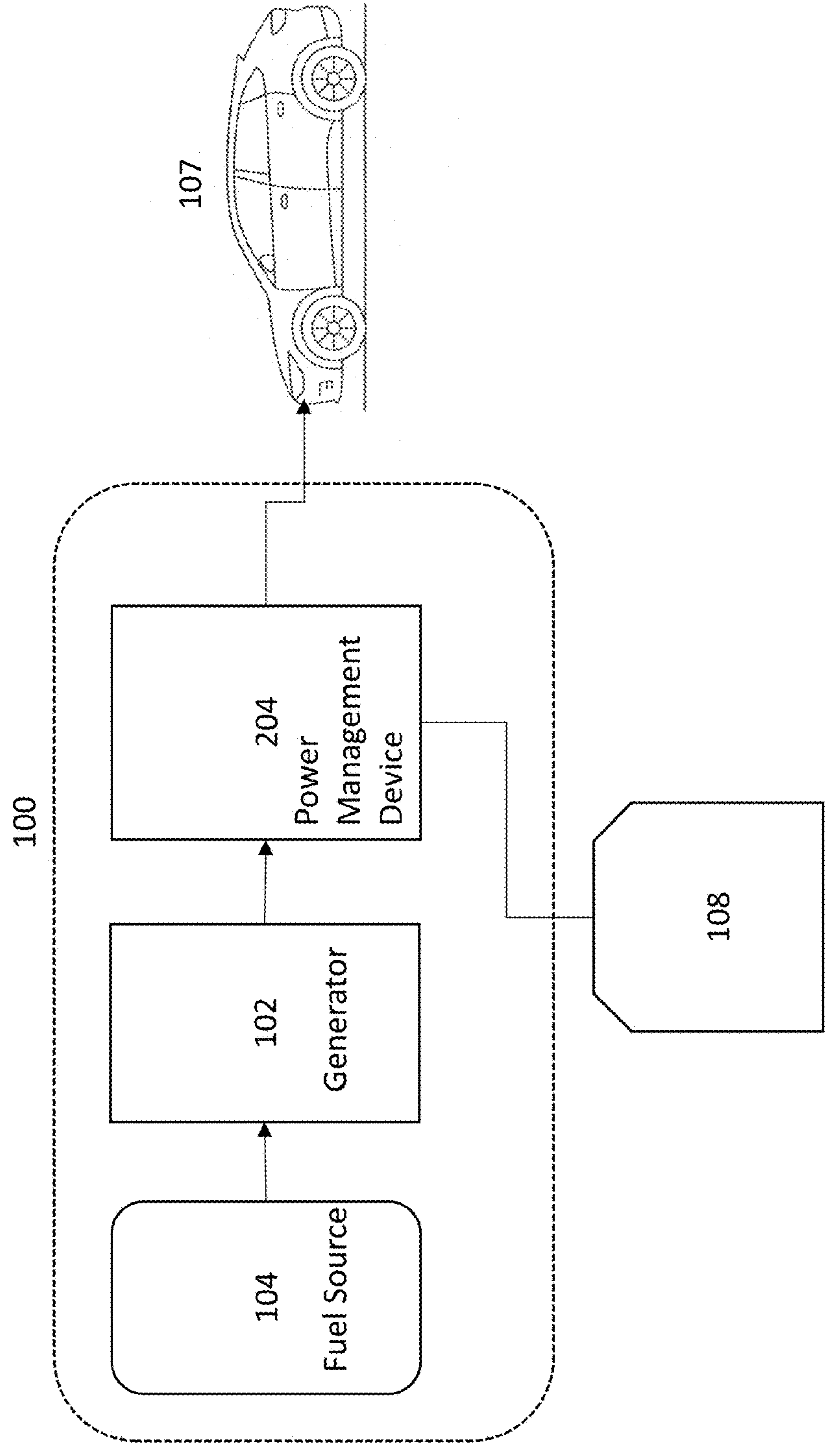
FIG. 2 is an illustrative diagram of an alternative configuration of components of an embodiment of the invention.

Electric cars dying on the road, and decreased range especially in summer and winter months, can place EV owners and operators at great peril. Not only are the operators, and passengers, stranded, they may have no ready access to emergency services or automotive repair facilities. Typically, electric vehicles that have completely depleted batteries can only be towed. Furthermore, some make and models of electric vehicles, for example all-wheel drive models, cannot be towed using a standard tow-truck, but must instead be placed on a flat bed truck for transport to a charging station. Additionally, in some areas, there is incomplete charging infrastructure such that a completely depleted vehicle must be transported long distances to a charging location. Such transport can derail a trip and result in extensive costs for the owner or operator of the electric vehicle. While depleted batteries can occur at any time, adverse weather conditions can contribute to accelerated battery depletion. For instance, excessive humidity in the summer or cold temperatures have both been shown to shorten the discharge cycle of EV batteries.

The invention described herein solves this problem. The EV charging device described herein eliminates the drawbacks associated with EVs becoming immovable when they are completely depleted. The descried EV charging device is sufficiently portable so as to integrate into a tow-truck, repair vehicle or other service vehicle is called upon to service the EV.

The present invention is directed to apparatus, systems and methods of providing quick electric charges. In one or more implementations, the described rapid or quick charging device is one or more power sources specifically configured to deliver sufficient charge to an EV so as to enable the EV to travel under its own power to the nearest EV charging facility. Furthermore, in some implementations, a portable EV charging infrastructure, using solar power is provided that is used to charge an EV vehicle where additional or extended range in needed. These configurations keep drivers on the road and moving without the drawbacks of becoming stuck with a depleted batteries, especially on hot humid and or cold days.

By providing the described EV charging apparatus and systems, the solution is provided that eliminates the risk to having a depleted EV that can not be moved, other than by expensive and potentially damaging means. In one or more implementations, the described EV charging device is provided in at least three (3) different configurations, a quick charging device, a EV boosting device, and a solar powered or charged device.

Furthermore, the described EV charging device is sufficiently portable that it may be carried in or with one or more makes or models of EV device. Such a configuration eliminates the need for costly or time consuming service visits.

The described approach solves a problem in the existing art. Currently, there exists no solution that provides location specific emergency charging for EVs. At presently, the preferred solution is to tow the EV to the closest charging station or the nearest authorized dealership and effect charging on those premises. As noted, towing an EV is expensive and sometimes can damage your vehicle. This is especially true for makes and models that have all-wheel drive. These EVs must be secured to a flatbed transport and taken to a location that have sufficient charging posts.

Turning now to FIG. 1, which details the portable EV charging device. As shown, an EV charging device 100 is provided in schematic form. The EV charging device 100 includes a generator 102, a fuel source 104 and an inverter 106. Additionally, the EV charging device can also include one or more charging wands that provide power to an EV 107.

As used herein, the term "portable" refers to the ability to transport the EV charging device and is not limited to devices that can be moved by one or more persons. For example, in the present context, a portable EV charging device is less than one (1) ton of weight.

The size and dimensions of the portable EV charging device vary depending on the needs and intended purpose. Single use EV charging devices can be tailored to fit within the trunk or storage compartment of an emergency vehicle or truck. In addition, it will be understood that the described EV chargers are intended to be waterproof, or water resistant, and include anti-corrosive coatings. Similarly, the EV chargers described herein are shock proof to avoid damage when accidentally dropped and grounded to avoid accidental discharges.

Furthermore, it will be appreciated that while, for ease of discussion, the EV described herein are passenger vehicles. However, any type of EV, including ATVs, tractors, e-bikes, go-karts, and golf carts, and the like are able to (grounded) not just EV cars but anything like ATV dirt bikes go karts loan equipment etc. In addition, while the present description is directed to pure EVs, the described EV charger can also be used with partial EVs, such as hybrid style vehicles.

In one or more implementations, the portable booster device can be designed or customized to look like the customers vehicle if wanted without altering the functionality of the devices described herein.

In one particular implementation, the generator 102 is a liquid fueled generator that receives a liquid fuel from the fuel source 104. In one particular configuration, the fuel source is gasoline. In an alternative configuration, the fuel source 104 is diesel fuel. In yet another implementation, the fuel source is propane or liquid natural gas. In yet a further implementation, the generator 102 is able to select from multiple different fuel sources. For example, in one arrangement, there are multiple fuel sources, such as gasoline and propane. Through the use of a controller or command interface (such as a switches, valves, or computer (such as a processor or custom controller) elements) the generator 102 is able to select the desired fuel.

Using the desired fuel, the generator is able to convert chemical and mechanical energy into electrical energy. It should be appreciated by those possessing an ordinary level of skill in the requisite art that one or more ancillary or accessory elements of a commercially available portable generator are understood and included within the scope of the term generator. Here, the generator is optimized to provide sufficient power to charge an EV. For instance, where the portable generator can be configured for long duration electrical power generator or increased power output, the portable generator 102 is optimized for increased power output. As noted, the generator 102, in one or more configurations, includes a portable and or compact generator power charger which consists of a gas and or diesel and or propane powered generator. In one or more further arrangements, the generator 102 is a hybrid generator that utilizes one or more fuels. In a further implementation, the generator 102 is a fuel-efficient generator with power converter to fast charge dc output.

By way of particular example, the provided generator 102 is configured to output sufficient power to enable rapid charging of an EV. For example, while typical generators are configured to provide 120V or 240V power for several hours, the presently provided generator 102 is configured to provide up to 480V. In one arrangement, the presently provided generator is configured to provide at least 2.5 kW. For example, the presently provided generator 102 provides sufficient charging power to an EV. By way of non-limiting example, the presently provided generator 102 provides charging power to an EV for at least five (5) minutes. In a further example, the presently provided generator 102 provides charging power for at least an hour. In other implementations, the generator 102 is configured to provide at least 120V 2.5 kW for at least 10 minutes. In further implementations, the generator 102 is configured to provide at least 120V 2.5 kW for at least 5 minutes.

In one or more specific implementations, the generator 102 is configured to produce DC current. It will be appreciated that most commercial generators produce AC current that first must be converted to DC if super charging functionality is employed. Here, the generator 102 is configured to directly produce DC current at sufficient voltage to charge the EV. For example, 120, 240 or 480V DC is produced directly by the generator 102. Such a generator is configured to provide at least 1 kW of DC.

Here, the electric generator configured to directly produce DC current can be used to boost, and or charge an EV. Such an EV charger can be started using a "jump" from a gasoline or other conventional fueled car. Once the electrical generator is started, it can be run from the car battery. Alternatively, a standalone 12, 36, 48 or 72V battery can be used to supply power without the need of liquid fuel to maintain operation. Here, the battery or conventionally fueled car provides energy to an electric motor. In turn the electric motor is connected to a DC generator. In one or more implementations, the electric motor includes one or more gear reduction assemblies that couples the rotational motion of the electric motor to the DC generator. For example, a DC motor can be used that receives at least 12V power and causes the generator to generate at least 120V output at a current sufficient to cause an EV to charge.

In an alternative implementation, the generator 102 is configured to provide variable voltage based on user controls or dynamic computer control based on one or more computer based communications. For example, the generator 102 also has a throttle or fast pump handle (not shown) for quick charging based on the particular conditions available. For example, the throttle is linked to the control systems of the generator 102, either directly or via software. Through use of the throttle, the generator 102 is configured to increase or decrease the amount of voltage and power provided to the EV during charging.

For example, a plurality of controls are integrated into the charging handle. In one arrangement, a rotary control device is integrated into the charging handle. The rotary control device is coupled to one or more processors, computers or control devices, such that when rotated in one direction, one or more batteries or supercapacitors are accessed such that additional amperage or voltage is delivered to the EV. In a further, and by way of non-limiting example, if it is an emergency situation and a boost is needed, the charging handle can be rotated or a control surface squeezed to access sufficient batteries or supercapacitors to enable 50% or more amps or voltage to be delivered to the EV over what is deliverable by the portable generator 102 alone.

It will be appreciated that the generator of the EV generator is used to transform chemical energy into electrical energy sufficient to meet required amount of amp/voltage required by the EV to be charged. In one or more arrangements, the power generated by the generator 102 is in the form of alternating current (AC). In this arrangement, an AC/DC converter is used to convert the AC to direct current. In one or more arrangements, the generator 102 is configured to supply direct DC to the EV to be charged. In this arrangement, the generator 102 is configured to operate as a Direct-current fast charger (DCFC) (a Level 3 DC charger). For example, the generator 102 is configured to generate a 3-phase 480 volt AC. Through the use of an invertor, the AC is converted to DC for delivery to the EV.

In one or more implementations, a method of using the described EV charger is provided. The method includes the steps of activating the liquid fuel generator. Determining, via one or more computer accessible sensors, that the generator is producing a consistent voltage for output. Once the generator is providing a consistent level needed for boost, connecting the charger connector to vehicle. The method also includes monitoring, using one or more computer based monitoring platforms, that the EV is being charged by the EV charger. Once the EV charger has been charged sufficiently to enable EV travel to the nearest charger installation, provide a notification to the user.

A processor or computer is configured to evaluate the current charge state of the EV and determine the nearest appropriate charging location. One or more software applications are configured to identify, using GPS coordinates, the nearest charging station for the particular make and model of EV. Based on the location of the nearest charging station, the software application configures the processor to identify the charge level of the EV necessary to travel to the identified location. For example, the software application takes into account, traffic, weather conditions, and road terrain. For instance, where the nearest location is at a significantly increased elevation from the EVs current location, the effective distance is increased, thus necessitating additional charge to reach that location.

In one or more implementations, the the EV charger is configured to communicate with the EV. For example, where the EV is able to communicate using wireless communication protocols (such as diagnostic or service communication protocols) the EV charger is able to assess the operational status of the EV during charging. Where the EV indicates there is a problem or danger encountered during charging, the EV charger is able to cease providing charge to the EV. Likewise, based on the make and model of the EV, the EV charger is able, using one or more software routines executed by one or more computers, to determine one or more safe threshold for boost charging. Where the user attempts to exceed this threshold by using the boost functionality, the processor or computer of the EV charger automatically limits the amount of additional power delivered to the EV.

In one or more particular implementations, the EV charger is configurable as a home generator. For example, the EV charger is equipped with one or more connections that allow the EV charger to supply power to one or more home appliances, such as an appliance that requires 110, 120, or 240 volts. Here, the EV charger also can be used to power a home (such as an apartment or stand-alone house) and accessories if power loss occurs.

Depending on the size of the EV charger, such as due to the amount of associated supercapacitors or batteries, the EV charger can be kept in a vehicle and be used to run high voltage A/C compressor and/or a high voltage heater when stuck in cold or extreme heat/weather.

In a particular implementation, the generator 102 includes a generator with high Amp and output impeller. The generator 102 further includes a DC power outlet connector with power inverter.

In one or more further implementations, the EV charger includes, in addition to the liquid fuel generator 102, a series of batteries or other electrical energy storage devices 108. In one particular form the energy storage devices 108 are one or more lithium-ion battery packs. However, in alternative configurations, other battery types, such as lead-acid, nickel-metal, nickel-cadmium, lithium-ion polymers batteries are used. However, any form of rechargeable battery can be used in connection with the devices described herein.

When used in connection with a liquid fuel generator 102, the energy storage devices 108, such as lithium ion battery packs, are configured to increase the output voltage or current provided by the generator 102. In an alternative configuration, the energy storage devices 108 includes one or more supercapacitors that are configured with the lithium ion battery packs to supply sufficient power to the EV when charging.

Figure 3:
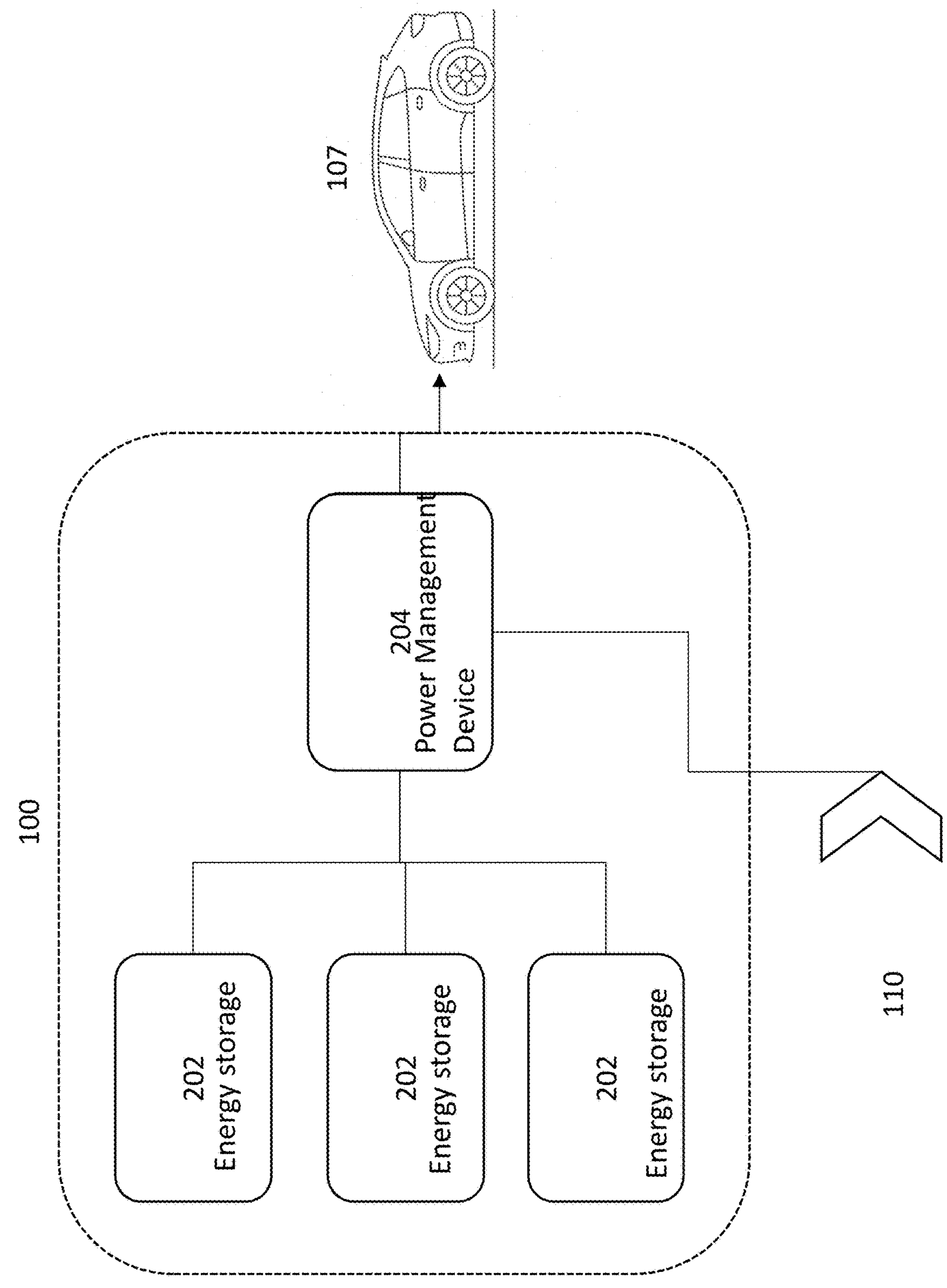
FIG. 3 is an illustrative diagram of an alternative configuration of components of an embodiment of the invention.
Figure 4:
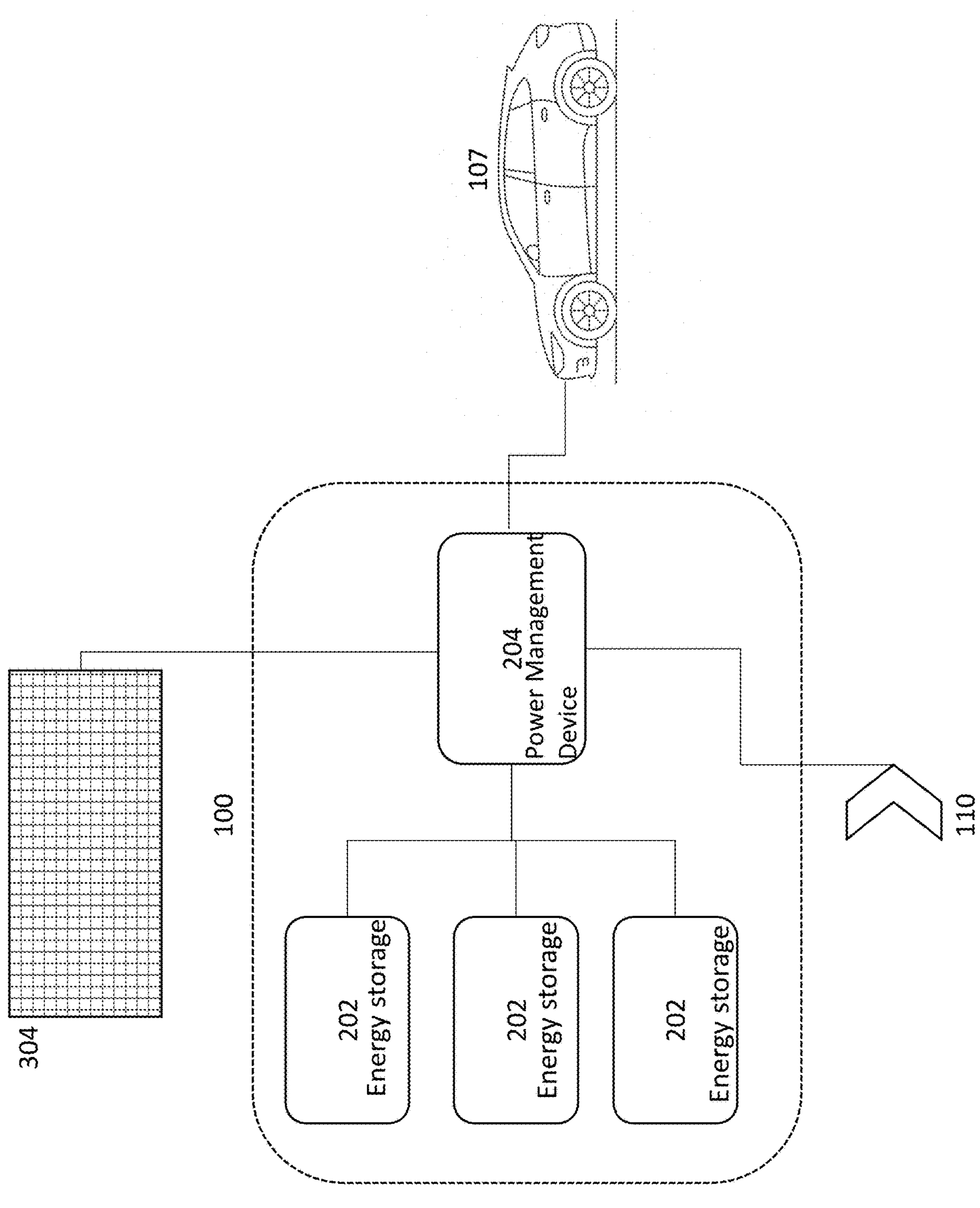
FIG. 4 is illustrative diagram of an alternative configuration of components of an embodiment of the invention.

As shown in FIGS. 3-4, the EV charger 100 includes a plurality of batteries or other electrical energy storage devices 202. For example, EV charger 100 may include one or more different battery types connected in series or parallel to provide sufficient dc charging power to an EV. In a further configuration, the electrical energy storage devices includes one or more supercapacitors. In one or more further arrangements, EV charger 100 includes a power isolater and separator. Here, such components are used to output DC power to the charging handle.

In one or more particular implementations, the battery array of the battery-based EV charger can be charged using a standard 120V AC electrical connection. For example, a standard AC plug 110 is used to charge the battery based EV charger. However, in alternative configurations, the battery-based EV charger can be charged using 240V AC connections using the AC plug 110.

In one or more further configurations, the battery-based EV charger can be charged from a 12V DC connection (not shown). For example, a gasoline powered vehicle, such as a car or truck, typically includes as 12V DC output. The battery based EV charger can be charged using this 12V DC output. In one arrangement, the battery-based EV charger is charged by an 12V DC output prior to use on the depleted EV charger. However, in an alternative configuration, the battery-based EV charger can be charged while providing power to a depleted EV. For example, where the battery-based EV charger includes multiple battery arrays 202, one array can be selected for providing charging power to the depleted EV, while one or more other battery arrays 202 are charged by the 12V system. In a specific implementation, a power management device 204, or processor (such as a computer) is used to manage and monitor the charging and discharging of the battery-based EV charger. The power management device 204 is configured to determine the charge level of one or more addressable or accessible battery arrays 202 of the battery-based EV charger. Where one or more of the battery arrays 202 has sufficient charge to supply a depleted EV, the power management device 204 configures the identified battery array to supply the depleted EV. While the depleted EV is being charged, the battery-based EV charger is also charging one or more additional battery arrays 202 using the 12V DC output provided by a gasoline based vehicle. The power management device 204 is further configured to switch the battery array undergoing charging and discharging to the depleted EV. For instance, where the charging battery array has sufficient charge to supply power to the depleted EV for at least one (1) minute the power management device 204 will cause this array to supply power while a different array is being charged. In this manner, it is possible to have consistent or semi-consistent charging of the depleted EV using power from a 12V source.

As shown in FIG. 4, in yet a further implementation, the EV charger 100 includes one or more solar panels 304. For example, the housing of the EV charger 100 includes integrated solar panels 304. However, in a further implementation, the associated solar panels 304 are arranged separately or independently from the EV charger 100. For example, one or more solar panel arrays 304 or arrays of arrays are provided that supply power to the generator 102.

In one arrangement, the solar panels 304 provide operating power to the EV. However, in an alternative arrangement, the solar array provides sufficient power to charge the lithium-ion batteries or supercapacitors. In response, the supercapacitors or lithium-ion batteries are then used to supply power to the attached EV. In either configuration, the generator 102 includes a solar plate panel with a power inverter and a storage battery. The generated power from the solar panels 304 provides sufficient capacity (environmental conditions permitting) to enable the quick charger functionality and provide power to an EV using connector outlet.

In a particular implementation, a system is provided for charging an electric vehicle. In one implementation, the systems includes a vehicle configured to transport a liquid fueled generator; a liquid fueled generator configured to output at least 480 volts at 2.3 kW of direct current (DC) for at least 10 minutes; a fuel tank for supplying liquid fuel to the liquid fueled generator; and a control system configured to control the liquid fueled generator so as to maintain sufficient output of DC to provide charging power to the electric vehicle.

As further shown in FIGS. 3-4, in one or more arrangements, the system described herein can also utilize one or more compact lithium-ion batteries or other energy storage devices that are used to boost or supply the desired output.

In one or more further implementations, the EV charger is configured as a rapid charging device. Here, the EV charger is a portable device that integrates a plurality of rechargeable lithium-ion batteries (202). However, in other arrangements, additional battery types are utilized. In one arrangement, the plurality of lithium-ion batteries is connected in series. In an alternative arrangement, the plurality of lithium-ion batteries is connected in parallel. In one or more further arrangements, the plurality of lithium-ion batteries is connected in sub-groups in series, and sub-groups of lithium ion batteries are then connected in parallel. In this configuration, there are dynamically configurable arrays of batteries. For example, one or more software applications configure software controlled switches or other devices to enable reconfigurable arrangements of the subunits. Regardless of the particular configuration of lithium-ion batteries, the lithium-ion batteries array are connected to an isolator. Here, the isolator ensures all batteries are evenly charged and balanced. In one or more arrangements, a power controller is used to route the electrical energy stored within the lithium-ion battery array to the charging wand. In one arrangement, the EV charger described is further equipped with a separator. Here, the separator will direct the correct current to the vehicle from all batteries. In this configuration, it is possible to provide rapid charging by combining multiple batteries into subunits. Here the subunits can be dynamically coupled to one another based on the intended need. For example, using one or more software controlled switches, the subunits can be combined in parallel or series to either increase the output voltage or current depending on the need of the user.

In a particular implementation a processor or computer is used with one or more control interfaces or devices to provide information regarding the operation of the EV charger. For instance, and in no way limiting, the EV charger includes one or more charge indicators. Here, the charger indicators can be a screen, panel, LED display, or other display configuration. For example, a series of charging level LEDs are integrated into a chassis of the battery based EV charger. Where all the LEDs are illuminated, the integral batteries or supercapacitors are fully charged. Where only a single LED is illuminated, the battery-based EV charger is in need of charging.

In a yet further arrangement, the EV charger is a solar power or renewable power-based system. In this configuration, the EV charger is in a solar pack booster configuration. In the solar pack booster configuration, the EV charger includes a solar panel and or panels that are used to charge one or more internal rechargeable batteries. The amount and performance characteristics of the solar panels 304 is dependent on the specific intended EV vehicle amp/voltage. In a further arrangement, the EV charger configured as a solar pack booster includes an inverter. Here, after the sunlight hits the panel, the electrons pass through and are converted to dc. In this configuration, there is no need to change the current from alternating to direct and a fast dc charging cable can be used to transfer power generated directly from the panel or panels to the vehicle. In another configuration, the solar panels 304 are used to store an electric charge within one or more arrays of rechargeable batteries. These batteries can then be used to charge the EV in the same manner as described herein.

In one or more configurations, the solar panel booster/charger needs to be place on top of vehicle. Here, the solar panel is placed in an area free of obstruction. In one particular implementation, a magnetic base is used to secure the solar panel to the roof of the vehicle. Alternatively, if the vehicle has a glass roof (such as a sunroof or moonroof) quick release straps can be used to secure the solar panel.

As with the other models of the EV charger, here, the solar based EV charger includes one or more display elements that identify the current charging state of the internal batteries. For example, one or more multicolor LEDs are used to display the current charging status. For instance, using a red LED, the LED will stay red when charging or at low power, yellow at 50% charge and green at 100% capacity charged.

It will be appreciated that for the fuel-based generator, the battery-based generator and the solar based generator, the general operation remains the same. Specifically, one or more control interfaces are used to start the generator and deliver power to the EV. However, there are particular steps employed based on the specific generator model used. For example, where the solar panel-based generator is used, the solar panels 304 must be deployed to capture sunlight. In one or more implementations, the solar panels 304 are installed on vehicle, such as a service or maintenance vehicle. In one arrangement, the solar panels 304 are deployed while the vehicle is stationary, or during movement, to charge while driving or stationary, position is key for placement of panel.

In one or more further implementations, the EV charger is equipped with fans for cooling the EV charger during operator. In specific implementations, these fans are also configured to provide regenerative power when rotated by wind. For example, if the EV charger is placed on a flatbed or outside of a maintenance vehicle, the fans will be rotated during movement of the vehicle. In this manner, the fans can function as wind turbines and produce an electric charge that can be stored by the internal batteries of the EV charger.

In further arrangements, the EV charger generator includes one or more supercharger and turbo type configurations that allow for high performance operations. Such EV charger generators further include liquid or other active and dynamic cooling mechanisms. For example, the liquid cooled, swappable elements, nitrous oxide, or any other form of turbo or supercharged operation is considered and appreciated.

In one or more implementations, the EV charger described is configured to provide an EV with sufficient electrical charge to enable the EV to travel at least one (1) mile. In an alternative implementation, the EV charger is able to supply an EV with sufficient charge to provide a 100-mile range. In an alternative implementation, the EV charger is able to supply an EV with sufficient charge to provide a less than 1-mile range. The exact range supplied by the EV charger will vary due to a number of variables, including but not limited to the model of EV under charging, and the current state of the EV's battery.

In one or more additional implementations, the EV is equipped with a wireless power transmission receiver. In this configuration, the EV is equipped to be charged using one or more short range power transmission devices. Here, the EV Charger is configured to provide a wireless charging adaptor to the charging wand. This adaptor enables wireless charging, without the need to alter the internal mechanisms of the charging wand.

As discussed, the EV charger is configured to provide a range of potential operating voltages to the EV under charge. In one or more implementations, the EV charger is able to supply 100V to the EV. In another implementation, the EV charger is configured to supply 800V to the EV. In one or more implementations, the EV charger is equipped with sufficient circuitry and control devices to allow for the EV charger to supply between 100V and 800V. For example, one or more processors or controllers integrated into the EV charger is pre-programmed with the operating or charging voltages of particular makes and models of EVs.

By way of example, the EV charger is equipped with one or more processors, sensors, control systems and power management devices to allow for the efficient charging of 12 or 36 and 48 Volt systems. In another implementation, the EV charger is configured to charge 72 Volt systems.

In a further implementation, a small battery is provided inside the charging element to operate cooling elements or a liquid cooling system. In one or more implementations a touch screen for example like an Phone touchscreen is used to control the operation of the charging device. One or more implementations a application is used to start the EV charger.

In one or more further implementations a drone is used to deliver the charging booster for example if a car is disabled in an area that is inaccessible by vehicles. And one or more further implementations AC and DC can be used to charge both ways.

In one or more implementations, the EV charger is further equipped with one or more low voltage ports. For example, the EV charger includes one or more USB-C or USB-B connectors that allow for low-voltage charging. In one or more further implementations, the EV charger is equipped with one or more device charging ports that are configured to charge one or more electronic devices.

In particular implementations, the EV charger has one or more control switches, dials, gauges or control interfaces embedded within one or more surfaces of the EV charger. For example, one or more touch screen devices, controllable by a processor or computer, are embedded within the surface of the EV charger. A user is able to control the operation of the EV charger using the touch screen. Here, the processor is used to select one or more low voltage ports to deliver power. In a further arrangement, the processor or computer is configured by the touch screen device to deliver power suitable for a particular make and model of EV. For instance, and in no way limiting, the processor or computer includes a plurality of pre-set settings. Here, each setting corresponds to a charging protocol for a particular make and model of EV. By selecting the particular protocol, the EV charger is configured to deliver power to the specific EV model of interest. In a further implementation, the processor of the EV charger is further configured to monitor the charging state of one or more internal batteries (such as the lithium ion batteries), or the state of the solar panels 304

In a non-limiting example, the processor of the control unit 204 and any remote computer communicatively coupled to the processor are commercially available or custom built computers equipped with one or more processors, graphical processing units, field programmable gate arrays, RAM and ROM memory, network interface adaptors, and one or more input or output devices. In a further embodiment, the processor or computer is a computer server or collection of computer servers, each server configured to store, access, process, distribute, or transmit data between one another and other computers or devices accessible or connectable therewith. In still a further embodiment, processor (or computer element) is a hosted server, virtual machine, or other collection of software modules or programs that are interrelated and hosted in a remote accessible storage device (e.g. cloud storage and hosting implementation) that allows for dynamically allocated additional processors, hardware, or other resources on an "as-needed" or elastic need basis. In a further embodiment, the processor is configured to implement elastic load balancing algorithms to harness remote computing capacity or functionality to enable the system to handle computationally or otherwise resource intensive actions and procedures.

In a particular arrangement, the processor or computers referenced herein are desktop or workstation computers using commercially available operating system, e.g. Windows®, OSX®, UNIX, or Linux based implementation. In a further configuration, the processor or computer is a portable computing device such as an Apple IPad/IPhone® or Android® device or other commercially available mobile electronic device configured to have access to or implement remote hardware as necessary to carry out the functions described. In other embodiments, the processor or computer includes custom or non-standard hardware configurations. For instance, the processor comprises one or more microcomputer(s) operating alone or in concert within a collection of such devices, network(s), or array of other micro-computing elements, computer-on-chip(s), prototyping devices, "hobby" computing elements, home entertainment consoles, and/or other hardware.

In a non-limiting example, the processor of the control unit 204 and any remote computer communicatively coupled to the processor are commercially available or custom built computers equipped with one or more processors, graphical processing units, field programmable gate arrays, RAM and ROM memory, network interface adaptors, and one or more input or output devices. In a further embodiment, the processor 204 or computer is a computer server or collection of computer servers, each server configured to store, access, process, distribute, or transmit data between one another and other computers or devices accessible or connectable therewith. In still a further embodiment, processor 204 (or computer element is a hosted server, virtual machine, or other collection of software modules or programs that are interrelated and hosted in a remote accessible storage device (e.g. cloud storage and hosting implementation) that allows for dynamically allocated additional processors, hardware, or other resources on an "as-needed" or elastic need basis. In a further embodiment, the processor is configured to implement elastic load balancing algorithms to harness remote computing capacity or functionality to enable the system to handle computationally or otherwise resource intensive actions and procedures.

In a particular arrangement, the processor or computers referenced herein are desktop or workstation computers using commercially available operating system, e.g. Windows, OSX, UNIX, or Linux based implementation. In a further configuration, the processor or computer is a portable computing device such as an Apple IPad/IPhone or Android device or other commercially available mobile electronic device configured to have access to or implement remote hardware as necessary to carry out the functions described. In other embodiments, the processor or computer includes custom or non-standard hardware configurations. For instance, the processor comprises one or more micro-computer(s) operating alone or in concert within a collection of such devices, network(s), or array of other micro-computing elements, computer-on-chip(s), prototyping devices, "hobby" computing elements, home entertainment consoles, and/or other hardware.

What is claimed is:

1. An apparatus for charging an electric vehicle comprising:

a. at least one liquid fuel based portable power source configured to output at least 110 volts of DC for at least 5 minutes;

b. at least one solid state source of current; and c. a control system configured to combine the output of at least the at least one liquid fuel portable power source and the at least one solid state fuel source and thereby provide either a current or voltage output higher than possible using the at least one liquid fuel source, wherein the at least one solid state source of current is configured to increase the output voltage or current provided by the at least one liquid fuel based portable power source, wherein the control system is further configured to communicate with the electric vehicle to determine at least the charging status of the electric vehicle.

2. The apparatus of claim 1, further comprising a charging wand having at least one integrated control device configured to couple to a charging port of an electric vehicle.

3. The apparatus of claim 2, wherein the at least one integrated control device is configured to cause an increase in the voltage or current output of the least one solid state source of current delivered to the electric vehicle.

4. The apparatus of claim 3, wherein the at least one liquid fuel based electrical grid independent portable power source is configured to select from at least two different liquid fuels.

5. The apparatus of claim 4, wherein the at least one solid state source of power further includes one or more rechargeable battery packs.

6. The apparatus of claim 3, wherein the at least one solid state source of current includes one or more arrays of supercapacitors.

7. The apparatus of claim 1, wherein the at least one liquid fuel source portable power source includes an electric generator configured to output alternating current and an alternating current to direct current converter and one or more rechargeable lithium ion battery packs.

8. The apparatus of claim 1, wherein the voltage output is at least 240 volts of direct current.

9. The apparatus of claim 8, wherein the voltage output is at least 480 volts of direct current.

10. The apparatus of claim 1, wherein:

the liquid fueled generator is configured to output at least 2.3 kW of direct current (DC) for at least one hour.

11. The apparatus of claim 1, wherein the apparatus is portable and configured to be transported within a vehicle.

12. The apparatus of claim 1, further comprising at least one communication module accessible by the control system and configured to exchange data with the electric vehicle, wherein the control system is further configured by software executing therein, to determine, using data received from the electric vehicle, a charging threshold, and restrict the amount of electrical power delivered to the electric vehicle to not exceed such a threshold.

13. A system configured for charging an electric vehicle comprising:

a. a vehicle configured to transport a liquid fueled generator;

b. a liquid fueled generator configured to output at least 480 volts at 2.3 kW of direct current (DC) for at least 10 minutes;

c. a plurality of fuel tanks for supplying one of at least two liquid fuels to the liquid fueled generator;

d. at least one solid state source of current; and e. a control system configured to combine the output of at least the at least one liquid fueled generator and the at least one solid state fuel source, wherein the at least one solid state source of current is configured to increase the output voltage or current provided by the at least one liquid fuel based portable power source, and thereby provide a voltage output higher than the at least one liquid fuel source, so as to maintain sufficient output of DC to provide charging power to the electric vehicle.

* * * * *